United States Patent [19]
Mistry et al.

[11] Patent Number: 5,922,116
[45] Date of Patent: Jul. 13, 1999

[54] PHTHALOCYANINE COMPOUNDS

[75] Inventors: Prahalad Manibhai Mistry, Ashton-Under-Lyne; Ronald Wynford Kenyon, Bridport, both of United Kingdom

[73] Assignee: Zeneca Limited, London, United Kingdom

[21] Appl. No.: 09/051,250

[22] PCT Filed: Sep. 20, 1996

[86] PCT No.: PCT/GB96/02298

§ 371 Date: Apr. 7, 1998

§ 102(e) Date: Apr. 7, 1998

[87] PCT Pub. No.: WO97/13812

PCT Pub. Date: Apr. 17, 1997

[30] Foreign Application Priority Data

Oct. 7, 1995 [GB] United Kingdom ............... 9520492

[51] Int. Cl.$^6$ ............... C09D 11/02; C09B 47/04
[52] U.S. Cl. ............... 106/31.47; 106/31.49; 540/124; 540/125; 427/466; 428/195
[58] Field of Search ............... 106/31.47, 31.49; 540/124, 125; 427/466; 428/195

[56] References Cited

U.S. PATENT DOCUMENTS

| | | | |
|---|---|---|---|
| 3,053,849 | 9/1962 | Clark et al. | 540/125 |
| 4,069,064 | 1/1978 | Mett et al. | 106/31.49 |
| 4,448,722 | 5/1984 | Crounse | 540/125 |
| 4,647,409 | 3/1987 | Groll et al. | 540/125 |
| 5,123,960 | 6/1992 | Shirota et al. | 106/31.49 |
| 5,503,666 | 4/1996 | Mennicke et al. | 106/31.43 |

FOREIGN PATENT DOCUMENTS

| | | |
|---|---|---|
| 174 586 | 3/1986 | European Pat. Off. . |
| 418 792 | 3/1991 | European Pat. Off. . |
| 677 557 | 10/1995 | European Pat. Off. . |
| 1 368 650 | 12/1964 | France . |
| 1 064 661 | 9/1959 | Germany . |
| 28 42 187 | 4/1980 | Germany . |

*Primary Examiner*—Helene Klemanski
*Attorney, Agent, or Firm*—Pillsbury Madison & Sutro, LLP

[57] ABSTRACT

A compound of the Formula (1) and salts thereof:

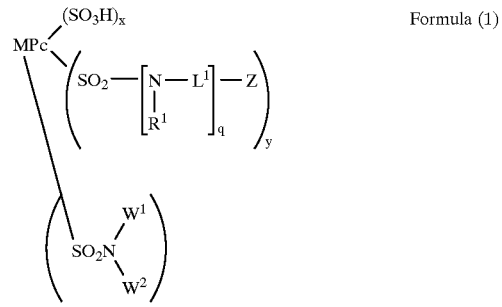

wherein:
  M is a metal or hydrogen;
  Pc is a phthalocyanine nucleus;
  each $R^1$, $W^1$ and $W^2$ independently is H or optionally substituted alkyl, aryl or aralkyl;
  each $L^1$ independently is a divalent organic linking group;
  Z is an optionally substituted piperazinyl group;
  q is 1 or 2;
  x,y and t each independently have a value of 0.5 to 2.5; and
  (x+y+t) is 3 to 4.

A process for making the compounds of Formula (1). The compounds of Formula (1) are useful as colorants for inks which are used in for example ink jet printing of substrates such as paper, plastics, textile materials, metal or glass.

14 Claims, No Drawings

PHTHALOCYANINE COMPOUNDS

This application is the national phase of international application PCT/GB96/02298 filed Sep. 20, 1996 which designated the U.S.

This invention relates to phthalocyanine compounds, inks their preparation and use.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good water fastness, light fastness and optical density, have fast fixation to the substrate and cause no clogging of the nozzle.

According to the present invention there is provided a compound of the Formula (1) and salts thereof:

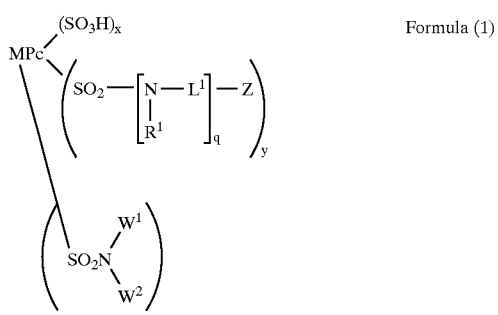

Formula (1)

wherein:

M is a metal or hydrogen;

Pc is a phthalocyanine nucleus;

each $R^1, W^1$ and $W^2$ independently is H or optionally substituted alkyl, aryl or aralkyl;

each $L^1$ independently is a divalent organic linking group;

Z is an optionally substituted piperazinyl group;

q is 1 or 2;

x,y and t each independently have a value of 0.5 to 2.5; and (x+y+t) is 3 to 4.

M is preferably copper, nickel, scandium, titanium, vanadium, chromium, manganese, iron, cobalt, zinc, lithium, sodium, potassium, magnesium, calcium, barium, aluminium, silicon, tin, lead or rhodium, more preferably copper, nickel, scandium, titanium, vanadium, chromium, manganese, iron, cobalt or zinc, especially copper or nickel and more especially copper. When M is tri- or tetra-valent the valencies above 2 may be taken by coordination with halogen atoms or oxygen e.g. VO, AlCl, $PbCl_2$.

Each $R^1$, $W^1$ and $W^2$ is preferably H; optionally substituted $C_{1-4}$-alkyl, especially $C_{1-4}$-alkyl; optionally substituted phenyl; $C_{7-11}$-aralkyl, especially benzyl. It is particularly preferred that $R^1$ is H and $W^1$ and $W^2$ are H or $C_{1-4}$-alkyl.

The divalent organic linking group represented by $L^1$ is preferably alkylene, especially $C_{1-6}$-alkylene, more especially $C_{2-4}$-alkylene; aralkylene, preferably $C_{7-11}$-aralkylene, especially phenyl-$C_{1-4}$-alkylene; or arylene, preferably arylene having up to ten carbon atoms, especially, phenylene; which may be substituted or unsubstituted.

As examples of alkylene and aralkylene groups represented by $L^1$, there may be mentioned:

ethylene
1,2- and 1,3-propylene
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2,2-dimethyl-1,3-propylene
1-phenylethylene
1-chloro-2,3-propylene
1,6- and 1,5-hexylene
2,3-diphenyl-1,4-butylene
1-(methoxycarbonyl)-1,5-pentylene
1-carboxy-1,5-pentylene
2,7-heptylene
3-methyl-1,6-hexylene
—$CH_2CH_2OCH_2CH_2$—
—$CH_2CH_2SCH_2CH_2$—
—$CH_2CH_2SSCH_2CH_2$—

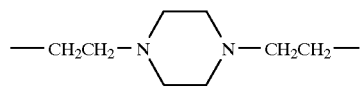

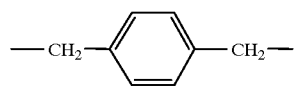

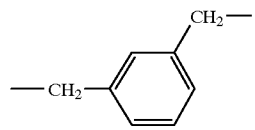

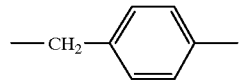

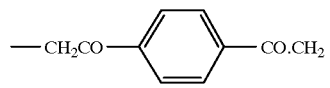

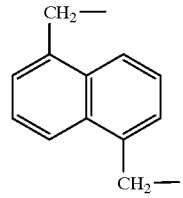

As examples of arylene radicals represented by $L^1$ there may be mentioned 1,2-1,3- and 1,4-phenylene and 1,4-naphthylene which are optionally sulphonated.

It is preferred that the divalent linking group $L^1$ is an optionally substituted $C_2$–$C_6$ alkylene linking group, especially a group of the Formula —$C_nH_{2n}$— wherein n is 2 to 6, preferably 2 to 4, more preferably 2.

The optional substituents which may be present on the piperazinyl group Z are preferably selected from optionally substituted alkyl, aryl, aralkyl, acyl and H.

When substituted, the piperazinyl group Z may contain up to 5 substituents, preferably up to 3. The substituents may be at the 2-, 3-, 4-, 5- or 6- positions of the piperazinyl group Z, especially at one or more of the 3-, 4- and 5- positions.

Accordingly, Z is preferably of Formula (2):

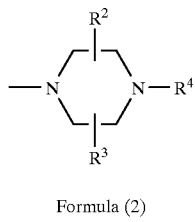

Formula (2)

wherein:
$R^2$ and $R^3$ each independently is H or optionally substituted alkyl; and
$R^4$ is H, optionally substituted alkyl, aryl, aralkyl, acyl or an ester group.
$R^2$ and $R^3$ are preferably H or optionally substituted $C_{1-4}$-alkyl, more preferably H or $CH_3$, especially H.

When $R^1$, $R^2$, $R^3$, $R^4$, $W^1$, $W^2$ or the divalent linking group $L^1$ is substituted it is preferred that the substituents are selected from $C_{1-4}$ alkyl, especially methyl; —OH; $C_{1-4}$-alkoxy, especially methoxy; carboxy; sulpho; amino, especially $NH_2$; halo; —CN; and $NO_2$.

$R^4$ is preferably H, optionally substituted $C_{1-4}$-alkyl or optionally substituted phenyl, more preferably optionally substituted $C_{1-4}$-alkyl. Preferred ester and acyl groups are of the Formula —$CO_2W$ and —COW respectively wherein W is optionally substituted aryl or optionally substituted alkyl, especially $C_{1-4}$alkyl, phenyl or benzyl.

When $R^4$ is an optionally substituted alkyl group, it is preferably of Formula (3):

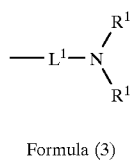

Formula (3)

wherein:
$L^1$ and each $R^1$ independently are as hereinbefore defined.

It is preferred that the divalent organic linking group $L^1$ in $R^4$ is optionally substituted $C_{2-6}$-alkylene, more preferably a group of Formula —$C_nH_{2n}$—, especially —$(CH_2)_n$—, wherein n is as hereinbefore defined.

The sum of (x+y+t) is preferably 4. It is preferred that x is from 0.8 to 2. Preferred values of y are from 1 to 2. Preferred values of t are from 0.8 to 2. As will be appreciated the value of (x+y+t) is an average value and the definition provided for the invention includes single compounds and compositions. Preferably q is 2.

The present invention include not only compounds of Formula (1) but also mixtures of compounds of Formula (1) and salts thereof. Preferred salts are those with alkali metals, especially Na, Li and K; or substituted ammonium.

The substituted ammonium cation may be a quaternary ammonium group of the Formula $^+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl radicals. Preferred heterocyclic rings formed by $NQ_4$ are 5 or 6 membered heterocyclic rings.

As examples of quaternary ammonium groups of Formula $^+NQ_4$ there may be mentioned $N^+(CH_3)_4$, $N^+(CH_2CH_3)_4$, N-methyl pyridinium, N,N-dimethyl piperidinium and N,N-dimethyl morpholinium. Alternatively the substituted ammonium cation may be a group of Formula $^+NHT_3$ wherein each T independently is H or $C_{1-4}$-alkyl, or two or three groups represented by T together with the nitrogen atom to which they are attached form a 5 or 6 membered ring, especially a pyridine, piperidine or morpholine ring.

As examples of groups of Formula $^+NHT_3$ there may be mentioned $(CH_3)_3N^+H$, $(CH_3)_2N^+H_2$, $H_2N^+(CH_3)(CH_2CH_3)$, $CH_3N^+H$, $CH_3CH_2N^+H_3$, $H_2N^+(CH_2CH_3)_2$, $CH_3CH_2CH_2N^+H_3$, $^+NH_4$, $(CH_3)_2CHN^+H_3$, pyridinium, piperidinium and morpholinium.

A particularly preferred compound according to the invention is of Formula (4) or a salt thereof:

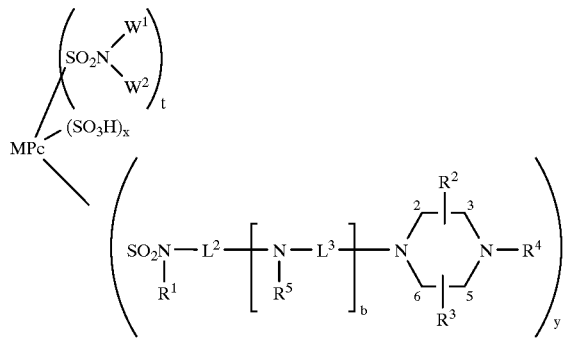

Formula (4)

wherein:
M, Pc, $W^1$, $W^1$, $R_1$, $R^2$, $R^3$ and $R^4$ are as hereinbefore defined;
$R^5$ is H or optionally substituted alkyl;
each $L^2$ and $L^3$ is an optionally substituted alkylene linking group;
(x+y+t) is from 3 to 4;
x is from 0.8 to 2;
y is from 1 to 2;
t is from 0.8 to 2; and
b is 0 or 1.

In the compound of Formula (4) it is preferred that $R^1$ is H.

$R^5$ is preferably H or optionally substituted $C_{1-4}$alkyl, more preferably H.

$L^2$ and $L^3$ are preferably each independently an optionally substituted alkylene linking group as hereinbefore defined for $L^1$, especially $C_{2-4}$-alkylene.

The groups $R^2$ and $R^3$ are preferably at the 2- and 5- positions on the piperazinyl ring.

According to a further aspect of the present invention there is provided a process for the preparation of a compound of Formula (1) comprising condensing a compound of Formula (5) and a compound of Formula (6):

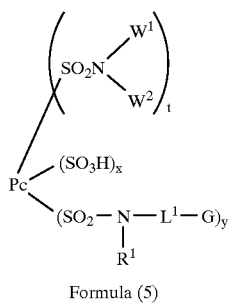

Formula (5)

H—Z

Formula (6)

wherein M, Pc, $W^1, W^2, R^1, L^1$, x,y,t and Z are as hereinbefore defined and G is a labile atom or group, preferably a labile halogen atom, especially Cl.

The condensation is preferably performed in the presence of base. The base may be any inorganic or organic base such as an alkali metal or alkali earth metal hydroxide, carbonate or bicarbonate or an organic base. Preferred organic bases are tertiary amines such as N-alkylated heterocycles, for example N-($C_{1-4}$-alkyl)morpholine, N-($C_{1-4}$-alkyl) piperidine, and N,N-di($C_{1-4}$-alkyl) piperazine; tri ($C_{1-4}$-alkyl)amines, for example triethylamine; and optionally substituted pyridine, especially pyridine.

The amount of base used may be varied between wide limits but it is preferred to use less than 40, more preferably less than 10 and especially from 3 to 5 moles for each mole of the compound of Formula (5).

The condensation is preferably performed using water as solvent. Ambient temperatures may be employed in conjunction with a reaction time of, for example, 5–24 hours, or elevated temperatures can be used for a shorter period.

After the condensation the product may be isolated by acidifying the reaction, mixture, preferably using a mineral acid, especially hydrochloric acid. Where the product precipitates as a solid it may be separated from the mixture by filtration.

If desired unwanted anions may be removed from the product of the above process by dialysis, reverse osmosis, ultrafiltration or a combination thereof.

The product of the above process may be converted, where necessary, to the alkali metal, $NH_4^+$, quaternary ammonium or organic amine salt by the addition of ammonia, ammonium hydroxide, primary, secondary, tertiary or quaternary amine. When the base used in the condensation process is an organic amine an excess may be used so that sulpho groups in the compound of Formula (1) automatically result as their organic amine salt.

When the compound of Formula (6) has two amino groups, the above described process can give a mixture of compounds of Formula (1) depending on which of the amino groups displaces the labile group G in the compound of Formula (5). For example, N-(2-aminoethyl) piperazine has an —$NH_2$ and an —NH— group, either of which can react with the compound of Formula (5). Thus the mixture results in which some of the compound of Formula (5) has reacted with the —$NH_2$ group and some has reacted with the —NH— group of the N-(2-aminoethyl)piperazine.

The compound of Formula (5) may be prepared by stepwise condensation of a compound of Formula MPc ($SO_2Cl$)$_{(x+y+t)}$ with an amine of Formula $HNR^1$-$L^1$-G and a compound of Formula $NHW^1W^2$ wherein M, Pc, x, y,t, $R^1, W^1, W^2, L^1$ and G are as hereinbefore defined. This condensation is preferably performed under aqueous conditions such as those described above for preparation of the compound of Formula (1).

The abovementioned compound of Formula MPc ($SO_2Cl$)$_{x+y+t}$ may be prepared using known methods, for example by heating a metal-free or metal-containing phthalocyanine optionally having up to four sulpho groups with chlorosulphonic acid, optionally followed by heating with $PCl_3$. Typically the heating with chlorosulphonic acid is performed above 60° C., preferably above 100° C., especially in the range 120° C. to is 165° C., preferably over a period of from 1 to 24 hours. Heating with $PCl_3$ is preferably performed at a lower temperature, especially 80°–105° C., over a period of 10 to 48, preferably 10 to 30 hours.

Examples of compounds of Formula $HNR^1$-$L_1$-G which may be used in the above process include 2-chloroethylamine, 3-chloropropylamine, 4-chloromethylbenzylamine, 2-bromoethylamine and 3-bromopropylamine.

Examples of compounds of Formula (6) which may be used in the above process include piperazine, 1-(2-aminoethyl)piperazine, 1-(2-hydroxyethyl)piperazine, 1-methylpiperazine, 1,4-bis-(3-aminopropyl)piperazine, 1-(3-aminopropyl)4-methylpiperazine, 2-methylpiperazine, 1-(carboxymethyl)piperazine and 1-(2-hydroxyethoxyethyl) piperazine.

The product of the above process forms a further feature of the present invention.

The compounds of Formula (1) are especially useful for the preparation of inks and accordingly there is provided an ink comprising a compound of Formula (1) or salts thereof and a medium, especially aqueous inks, used in ink jet printing and particularly thermal ink jet printing. The inks can be prepared according to known formulations.

The compounds of Formula (1) have high water fastness when printed onto paper, even when in the form of a salt with a metal (e.g. Na, K). Thus it is preferred to use free acids or metal salts of the compounds of Formula (1) rather than the potentially unpleasantly odorous amine salts to achieve good fastness results.

A preferred ink comprises a compound of Formula (1) according to the present invention and a liquid medium, preferably an aqueous medium. It is preferred that the compound is completely dissolved in the liquid medium to form a solution.

The ink preferably contains from 0.5% to 20%, more preferably from 0.5% to 15%, and especially from 1% to 5%, by weight of the compound of Formula (1), based on the total weight of the ink. Although the ink may contain less than 5% by weight of the compound of Formula (1) it is desirable that the dye has a solubility of around 10% or more to allow the preparation of concentrates which may be used to prepare more dilute inks and to minimise the chance of precipitation of the compound of Formula (1) if evaporation of the medium occurs during use.

The liquid medium, is preferably water or a mixture comprising water and a water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$-alkanol such as methanol, ethanol, n-propanol, isopropanol, n-butanol, sec-butanol, tert-butanol or isobutanol; an amide such as diemthylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2$–$C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy) ethanol, 2-(2-ethoxyethoxy)-ethanol, 2-[2-(methoxyethoxy)ethoxy] ethanol,2-[2-(2-methoxyethoxy)ethoxy]ethanol, 2-pyrrolidone or N-methylpyrrolidone; or a mixture containing two or more of the aforementioned water-soluble organic solvents.

Preferred water-soluble organic solvents are selected from 2-pyrrolidone, N-methylpyrrolidone, an alkylene glycol or lower alkyl ether of a polyhydric alcohol such as ethylene glycol, diethylene glycol, triethylene glycol or 2-methoxy-2-ethoxy-2-ethoxyethanol; and a polyethylene glycol with a molecular weight of up to 5000. A preferred specific solvent mixture is a binary mixture of water and either diethylene glycol, 2-pyrrolidone or N-methylpyrrolidone in a weight ratio as mentioned above.

Example of suitable ink media are given in U.S. Pat. No. 4,963,189, U.S. Pat. No. 4,703,113, U.S. Pat. No. 4,626,284 and EP 4,251,50A.

It is preferred that the inks of the present invention further comprise one or more of a penetrant to assist permeation of the dye into a paper substrate and a buffer such as sodium borate, to stabilise the pH of the ink.

A further aspect of the present invention provides a process for printing a substrate with an ink using an ink jet printer, characterised in that the ink contains at least one compound of Formula (1) or salt thereof.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

Substrates may be paper, plastics, textiles, metal or glass. Preferred substrates are overhead projector slides or cellulosic substrates, especially plain paper, which may have an acid, alkaline or neutral character.

The preferred ink used in the process is as hereinbefore described.

According to a still further aspect of the present invention there is provided a paper of an overhead projector slide printed with a compound of Formula (1) or salt thereof. According to a further aspect of the present invention there is provided a process for the coloration of a textile material with any of the abovementioned ink compositions comprising a compound of Formula (1) which comprises the steps:

i) applying to the textile material by ink jet printing the ink composition; and ii) heating the textile material at a temperature from 50° C. to 250° C. to fix the dye on the material.

The process for coloration of a textile material by ink jet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to ink printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xanthan gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN (available from ICI), which have a strong affinity for the textile material and the dye and thus increase the fixation of the dye on the textile material.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pre-treated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pre-treatment and dye compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

The invention is further illustrated by the following Examples in which all parts and percentages are by weight unless otherwise indicated.

EXAMPLE 1

Preparation of a compound of Formula (7)

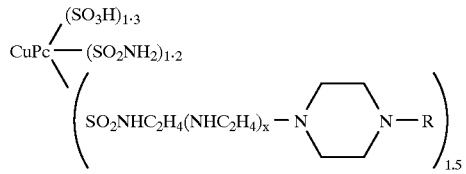

Formula (7)

wherein:
x is 1 and R is H
and x is 0 and R is $C_2H_4NH_2$

Cl Reactive Blue 25 (i.e. CuPc $(SO_3H)_{1.3}$ $(SO_2NHC_2H_4Cl)_{1.5}$, $(SO_2NH_2)_{1.2}$ from Zeneca Specialties, England (15 g)) was dissolved in water (300 cm³) and the pH adjusted to 8.0 by addition of 2N sodium hydroxide solution. N-(2-aminoethyl)piperazine (10 g) was then added to the solution and stirred at 70°–80° C. for 4 hours.

After cooling to 30° C., the pH was adjusted to 7.0 using concentrated hydrochloric acid. The product in free acid form was isolated by filtration and washed with water to give a mixture of the compounds of Formula (7) wherein x is 1 and R is H and x is 0 and R is $C_2H_4NH_2$.

The colorant in free acid form was charged into water (400 cm³) and dissolved by addition of 2M sodium hydroxide. The solution was dialysed to remove chloride ions, screened through a 0.45 μm filter and evaporated to dryness to give the sodium salt of the product.

When made into a ink by dissolving 2 parts of the colorant in water/diethylene glycol (92.5/7.5) and printed onto plain paper using a thermal ink jet printer, the ink gave bright strong cyan coloured prints having high water fastness and good light fastness.

The title colorant in the form of its lithium and ammonium salts gave prints of equal brightness and high water-fastness.

EXAMPLE 2

Preparation of a compound of Formula (7) where x is 0 and R is $CH_3$

In place of N-(2-aminoethyl)piperazine (10 g) used in Example 1 there was used 1-methylpiperazine (15 g). The product was dialysed, screened and evaporated and dried.

When made into an ink by dissolving 2 parts of the colorant in water/2-pyrrolidone (90/10) and printed onto plain paper using a thermal ink jet printer the colorant gave bright strong cyan prints having high water-fastness and good light-fastness.

EXAMPLE 3

Preparation of a compound of Formula (7) where x is 0 and R is $C_2H_4OC_2H_4OH$ In place of N-(2-aminoethyl)piperazine (10 g) used in Example 1 there was used 1-[2-(2-hydroxyethoxy)ethyl]piperazine (15 g). The colorant was converted to the ammonium salt, dialysed and screened and the solution evaporated and dried.

When made into an ink by dissolving 2 parts of the colorant in water/diethylene glycol (92.5/7.5) and printed onto plain paper using a thermal ink jet printer the colorant gave bright cyan shades having high water-fastness and good light-fastness.

EXAMPLE 4

Preparation of a compound of Formula (7) where x is 0 and R is $CH_2CH_2OH$

In place of N-(2-aminoethyl)piperazine (10 g) used in Example 1 there was used 1-(2-hydroxyethyl)piperazine (10 g). The sodium salt of the product was dialysed, screened evaporated and dried.

When made into an ink by dissolving 2 parts of the colorant in water/2-pyrrolidone (90/10) and printed onto plain paper using a thermal ink jet printer the colorant gave bright cyan prints having high water-fastness and good light-fastness.

EXAMPLE 5

Preparation of a compound of Formula (7) where x is 0 and R is H

In place of N-(2-aminoethyl)piperazine (10 g) used in Example 1 there was used piperazine hexahydrate (15 g).

The sodium salt of the product was dialysed, screened, evaporated and dried.

When made into an ink by dissolving 2 parts of the colorant in water/2-pyrrolidone (90/10) and printed onto plain paper using a thermal ink jet printer the colorant gave bright cyan shades having good water-fastness and high light-fastness.

EXAMPLE 6

Preparation of a compound of Formula (8)

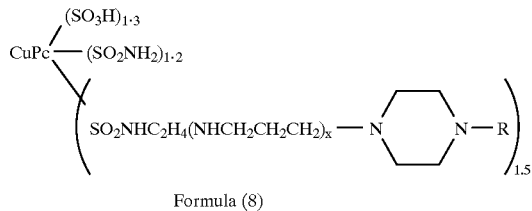

Formula (8)

wherein x is 1 and R is $CH_2CH_2CH_2NH_2$.

Example 1 was repeated except that in place of N-(2-aminoethyl)piperazine (10 g) there was used N,N-bis-(3-aminopropyl)piperazine (15 g). The colorant was converted to the ammonium salt, dialysed, screened, evaporated and dried.

When made into an ink by dissolving 2 parts of the colorant in water/2-pyrrolidone (90/10) and printed onto plain paper using a thermal ink jet printer the colorant gave bright cyan shades having good water-fastness and high light-fastness.

EXAMPLE 7

Preparation of a compound of Formula (8) wherein x is 1 and R is $CH_3$

Example 1 was repeated except that in place of N-(2-aminoethyl)piperazine (10 g) there was used 1-(3-aminopropyl)-4-methylpiperazine (10 g). The colorant in the form of its sodium salt was dialysed, screened, evaporated and dried.

When made into an ink by dissolving 2 parts of colorant in water/2-pyrrolidone (90/10) and printed onto plain paper using a thermal ink jet printer the colorant gave bright cyan shades having high water-fastness and good light-fastness.

We claim:

1. A compound of the Formula (1) and salts thereof:

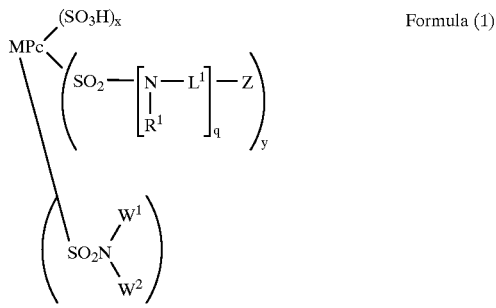

Formula (1)

wherein:
M is a metal or hydrogen;
Pc is a phthalocyanine nucleus;
each $R^1$, $W^1$ and $W^2$ independently is H or optionally substituted alkyl, aryl or aralkyl;
each $L^1$ independently is a divalent organic linking group;
Z is an optionally substituted piperazinyl group;
q is 1 or 2;
x, y and t each independently have a value of 0.5 to 2.5; and
(x+y+t) is 3 to 4.

2. A compound according to claim 1 wherein Z is of the Formula (2):

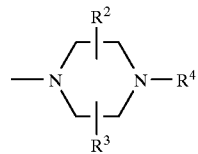

Formula (2)

wherein:
$R^2$ and $R^3$ each independently is H or optionally substituted alkyl; and
$R^4$ is H, optionally substituted alkyl, aryl, aralkyl, acyl or an ester group.

3. A compound according to claim 2 wherein $R^4$ is an optionally substituted $C_{1-4}$-alkyl group.

4. A compound according to claim 2 wherein $R^4$ is of the Formula (3):

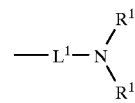

Formula (3)

wherein:
each $R^1$ independently is H or optionally substituted alkyl, aryl or aralkyl; and
each $L^1$ independently is a divalent organic linking group.

5. A compound of Formula (4) or a salt thereof:

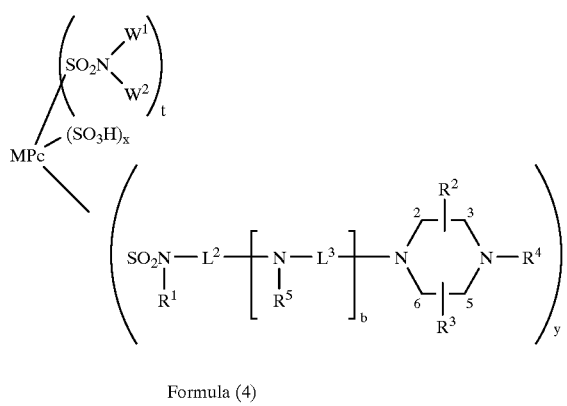

Formula (4)

wherein:
M is a metal or hydrogen;
Pc is a phthalocyanine nucleus;
each $R^1$, $W^1$ and $W^2$ independently is H or optionally substituted alkyl, aryl or aralkyl;
$R^2$ and $R^3$ each independently is H or optionally substituted alkyl;
$R^4$ is H, optionally substituted alkyl, aryl, aralkyl, acyl or an ester group;

$R^5$ is H or optionally substituted alkyl;

$L^2$ and $L^3$ are optionally substituted alkylene linking groups;

(x+y+t) is from 3 to 4;

x is from 0.8 to 2;

y is from 1 to 2;

t is from 0.8 to 2; and b is 0 or 1.

6. A compound according to claim 5 wherein R4 is of the Formula (3):

$$-L^1-N(R^1)R^1 \quad \text{Formula (3)}$$

wherein:

each $R^1$ independently is H or optionally substituted alkyl, aryl or aralkyl; and each $L^1$ independently is a divalent organic linking group.

7. A compound according to claim 5 wherein $L^2$ and $L^3$ are $C_{2-4}$-alkylene.

8. A compound according to any one of claims 2 to 7 wherein $R^2$ and $R^3$ are H or optionally substituted $C_{1-4}$-alkyl.

9. An ink comprising a compound according to any one of the preceding claims and a liquid medium.

10. An ink according to claim 9 wherein the medium is a liquid medium comprising water and a water-soluble organic solvent in a weight ratio of 99:1 to 1:99.

11. A process for printing a substrate with an ink comprising forming the ink into small droplets by ejection from a reservoir through a small orifice so that the droplets of ink are directed at a substrate wherein said ink contains a compound or salt thereof according to any one of claims 1 to 7.

12. A paper or an overhead projector slide printed with a compound or salt thereof according to any one of claims 1 to 7.

13. A process for the preparation of a compound of Formula (1) comprising condensing a compound of Formula (5) and a compound of Formula (6):

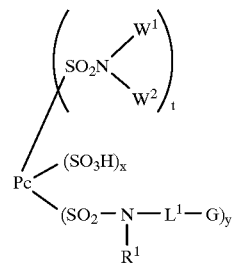

Formula (5)

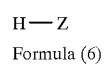

Formula (6)

wherein

Pc is a phthalocyanine nucleus;

each $R^1, W^1$ and $W^2$ independently is H or optionally substituted alkyl, aryl or aralkyl;

each $L^1$ independently is a divalent organic linking group;

Z is an optionally substituted piperazinyl group;

x, y and t each independently have a value of 0.5 to 2.5;

(x+y+t) is 3 to 4; and

G is a labile atom or group.

14. A process for the coloration of a textile material with the ink composition of claim 10 comprising a compound of Formula (1) which comprises the steps:

i) applying to the textile material by ink jet printing the ink composition; and ii) heating the textile material at a temperature from 50° C. to 250° C. to fix the dye on the material.

* * * * *